United States Patent [19]
Serafin

[11] Patent Number: 5,987,472
[45] Date of Patent: Nov. 16, 1999

[54] SYSTEM AND METHOD FOR HANDLING DATABASE CROSS REFERENCES

[75] Inventor: Stephen Anthony Serafin, Granville, Mass.

[73] Assignee: Combustion Engineering, Inc., Windsor, Conn.

[21] Appl. No.: 08/828,875

[22] Filed: Mar. 31, 1997

[51] Int. Cl.⁶ .................................................... G06F 17/30
[52] U.S. Cl. ................................ 707/104; 707/2; 707/3; 707/102
[58] Field of Search .................................. 707/2, 3, 102, 707/104

[56] References Cited

U.S. PATENT DOCUMENTS 5,493,679  2/1996  Virgil et al. ............................ 707/104
5,548,751  8/1996  Ryu et al. ............................... 707/102

OTHER PUBLICATIONS

Gillis et al., "Improving Software Maintenance Using System–Reverse Engineering", IEEE, p. 84–90, 1990.

Primary Examiner—Thomas G. Black
Assistant Examiner—Charles L. Rones
Attorney, Agent, or Firm—Alix, Yale & Ristas, LLP

[57] ABSTRACT

A system and method of managing, storing, and accessing cross references between related kinds of sub-record information in a computerized engineering database. A generic cross reference table which contains all the cross reference links for all the data items in all the data tables of the engineering database, is provided. Each link in the generic cross reference table is constituted by two records (1) a forward record with a specified link from a data item in a first data table to a record or a data item in a second data table, plus (2) a reverse record (partner record) with the link from the data item in the second data table to the record or an item in the first data table. Preferably, the link record in the cross reference table contains a link type value selected from a set of pre-defined link types for the pair of link points, comments associated with the link at the time of creation, and other link-creation information such as the identification of the user who created the link.

7 Claims, 14 Drawing Sheets

Generic Cross Reference Table — 64

— 80

| Record No. | Partner Record No. | Table 1 | Record 1 | Column 1 | Table 2 | Record 2 | Column 2 | Reference Type |
|---|---|---|---|---|---|---|---|---|
| 1 | 2 | Requirements | 15 | Statement | Document | 3473 | Doc Number | is stated in |
| 2 | 1 | Document | 3473 | Doc Number | Requirements | 15 | Statement | states |
| 3 | 4 | Requirements | 15 | Statement | Document | 5278 | Doc Number | is mandated by |
| 4 | 3 | Document | 5278 | Doc Number | Requirements | 15 | Statement | mandates |
| 5 | 6 | Valves | 2 | Size | Requirements | 16 | Requirement | is stated in |
| 6 | 5 | Requirements | 16 | Statement | Valves | 2 | Size | states |

Adding Second Forward/Reverse Cross Reference
(Item–to Item)

VALVES TABLE — 40

| RECORD No. — 42 | VALVE TYPE — 44 | SIZE — 46 | SYSTEM — 48 |
|---|---|---|---|
| 1 | GLOBE | 3 | RCS |
| 2 | GLOBE | 4 | RCS |
| 3 | GATE | 4 | SI |
| ... | | | |

Figure 3

Document Table (56)

| Record No. (58) | Doc Number (60) | Doc Name (62) |
|---|---|---|
| ... | | |
| 3473 | SR-92-1002/Rev0 | System Requirements |
| ... | | |
| 5278 | ANS-51-0 | ANS Standards |
| ... | | |

Figure 5

Requirements Table (50)

| Record No. (52) | Requirements Statement (54) |
|---|---|
| ... | |
| 15 | There shall be a .... |
| 16 | The system shall contain .... |
| ... | |

Figure 4

Generic Cross Reference Table 28

| Record No. 66 | Partner Record No. 82 | Table 1 68 | Record 1 | Column 1 70 | Table 2 72 | Record 2 74 | Column 2 76 | Reference Type 78 80 |
|---|---|---|---|---|---|---|---|---|
| 1 | | Requirements | 15 | Statement | Document | 3473 | Doc Number | is stated in |

Figure 6

Generic Cross Reference Table 28

| Record No. | Partner Record No. | Table 1 | Record 1 | Column 1 | Table 2 | Record 2 | Column 2 | Reference Type |
|---|---|---|---|---|---|---|---|---|
| 1 | 2 | Requirements | 15 | Statement | Document | 3473 | Doc Number | is stated in |
| 2 | 1 | Document | 3473 | Doc Number | Requirements | 15 | Statement | states |

Figure 7 – Adding Reverse Cross Reference (Item-to Item)

Generic Cross Reference Table — 64

| Record No. | Partner Record No. | Table 1 | Record 1 | Column 1 | Table 2 | Record 2 | Column 2 | Reference Type (80) |
|---|---|---|---|---|---|---|---|---|
| 1 | 2 | Requirements | 15 | Statement | Document | 3473 | Doc Number | is stated in |
| 2 | 1 | Document | 3473 | Doc Number | Requirements | 15 | Statement | states |
| 3 | 4 | Requirements | 15 | Statement | Document | 5278 | Doc Number | is mandated by |
| 4 | 3 | Document | 5278 | Doc Number | Requirements | 15 | Statement | mandates |
| 5 | 6 | Valves | 2 | Size | Requirements | 16 | Requirement | is stated in |
| 6 | 5 | Requirements | 16 | Statement | Valves | 2 | Size | states |

Figure 8 — Adding Second Forward/Reverse Cross Reference
(Item-to Item)

SYSTEM AND METHOD FOR HANDLING DATABASE CROSS REFERENCES

BACKGROUND OF THE INVENTION

The present invention relates to database management systems and methods, and more particularly, to a system and method for linking and displaying information records in an engineering database.

In some highly complex industrial endeavors, particularly where safety is a major concern, the designers and operators of such facilities have a need to establish and maintain current records of the design bases for the myriad systems and subsystems of the facility. As an example, nuclear power plants contain many inter-related systems, subsystems, and components which were designed according to formal as well as informal standards and criteria. With so many components in such a plant, and faced with planned and unexpected maintenance, repairs, and upgrades, managers of the plant have a clear need for capturing and maintaining information about each system, subsystem and component, in an engineering database.

Such database would typically contain a multiplicity of records, each of which has a plurality of data items which are related, for example, to a particular system, subsystem, or component. The database could be set up to have a plurality of data or record tables, e.g., a table in which each valve in the plant is listed as a distinct record having associated therewith in the table, particular data items such as the type of valve, size, and functional system in which that particular valve is situated. A conventional database system would establish a relationship between the particular record associated with a particular valve in the valve data table, and a parent relationship between the valve and a particular subsystem of which it is a part, or a child relationship with sub-components of that particular valve.

The user of such database system would in some instances, want to identify and understand, for example, what particular documents, what particular requirements, and what particular assumptions were used in specifying the type or size of a particular valve listed in the valve data table. Such need may arise, for example, during the course of designing the plant, licensing the plant with regulatory agencies, determining whether original components satisfy new regulatory or other standards, or determining whether replacement components are consistent with the original design.

SUMMARY OF THE INVENTION

It is, accordingly, an object of the invention to provide a system and method of managing, storing, and accessing cross references between related kinds of sub-record information in a computerized engineering database.

It is a particular object of the invention, to provide a flexible capability to create and access any number of bidirectional, categorized links between any two items of information in a database.

It is yet a further object that the invention enable a user to create the links at run-time without special programming, and to recover all the links with a single query to the database.

These objects are accomplished by providing a generic cross reference table which contains all the cross reference links for all the data items in all the data tables of the engineering database. Each link in the generic cross reference table is constituted by two records (1) a forward record with a specified link from a data item in a first data table to a record or a data item in a second data table, plus (2) a reverse record (partner record) with the link from the data item in the second data table to the record or an item in the first data table.

Preferably, the link record in the cross reference table contains a link type value selected from a set of pre-defined link types for the pair of link points, comments associated with the link at the time of creation, and other link-creation information such as the identification of the user who created the link.

The present invention thus provides a generic capability to rapidly link pairs of data items between any two records of any two tables within the database. It provides an improvement over conventional engineering database systems, for establishing and maintaining traceability of an item of information both as to its sources and to all database locations in which it has been used. The inventive technique provides flexibility to link information at three different levels selected by the user at run-time: data-item to data-item; record-to-data item; and record-to-record. A key feature of the invention is directional independence of the links involving data items. Links can be made without following any preferred order of the link pairs. Likewise, querying links to establish relationships of the link information is independent of which end of the link the query record is located.

To enable directional independence, each link record is paired with a system-generated partner record at the time the link record is created. The partner record stores the inverse of the link record. For example, a document record can be linked to a system requirement record with a link type which "states" the requirement. When the link record is created, the partner record is created within the same database transaction, with the link points reversed and the link type defined as the partner link type, whereby the requirement "is stated by" the document.

Any number of link type pairs may be defined for a given pair of tables. Any number of link records may be created for each pair of link points, provided they have different link types.

Preferably, interactive linking of a link pair is accomplished by means of a mouse-implemented drag and drop cursor manipulation when the invention is implemented in a Microsoft Windows operating system.

BRIEF DESCRIPTION OF THE DRAWINGS

These and other objects and advantages of the invention will become more evident from the following description of the preferred embodiment, made with reference to the accompanying drawings, in which:

FIG. 3 is a schematic representation of a data table containing data items associated with a list of valves in a plant;

FIG. 4 is a schematic representation of a data table containing a list of design or performance requirements;

FIG. 5 is a schematic representation of a data table containing a list of documents;

FIG. 6 is a schematic representation of the generic cross reference table according to the invention, at the moment a user has entered the basic information to establish the link definition for the first link record;

FIG. 7 is a schematic representation of the automatic generation by the invention, of a partner record in the generic cross reference table shown in FIG. 6, whereby the same linking relationship defined for the first link record is specified in reverse order;

FIG. 8 is a schematic representation of the generic cross reference table, as containing additional link records which specify linking relationships among data items from the three data tables shown in FIGS. 3–5;

DESCRIPTION OF THE PREFERRED EMBODIMENT

Figure 1:
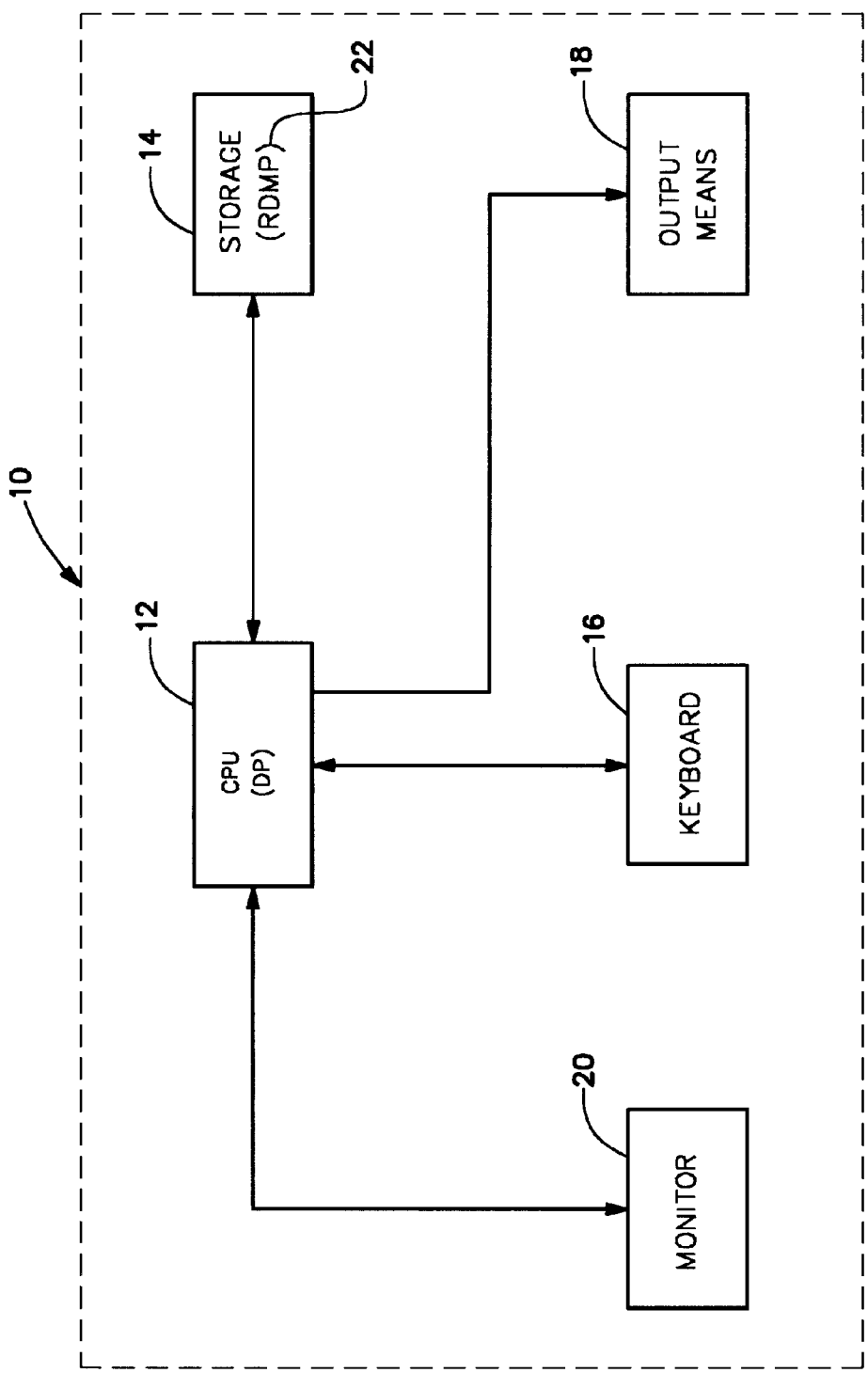
FIG. 1 is a schematic representation of an engineering database system including user interface.

FIG. 1 is a schematic representation of an engineering database system 10 which is implemented in a computer hardware platform including a data processor means 12, commonly referred to as a central processing unit, coupled to a data storage means 14, such as a hard drive or other digital storage media, and a keyboard 16 or similar data input means for the user to supply instructions and/or data to the data processor means 12. As is well known in computer database management systems, the data processor means 12 performs arithmetic and logic operations on digitized data received directly from the user via the data input means 16, and by interaction with instructions and operand data in the storage means 14. For purposes of the present invention, the storage means 14 contains a stored relational database computer program (RDMP) 22.

The user can receive real-time feedback of the keystrokes or other input and selections made at the data input means 16 by observing a display on the screen of monitor 20, which is coupled interactively with the data processor means 12. The user can also elect to record the results of the arithmetic and logic operation of the data processor means, by enabling and controlling output means such as a printer 18 or the like.

Figure 2:
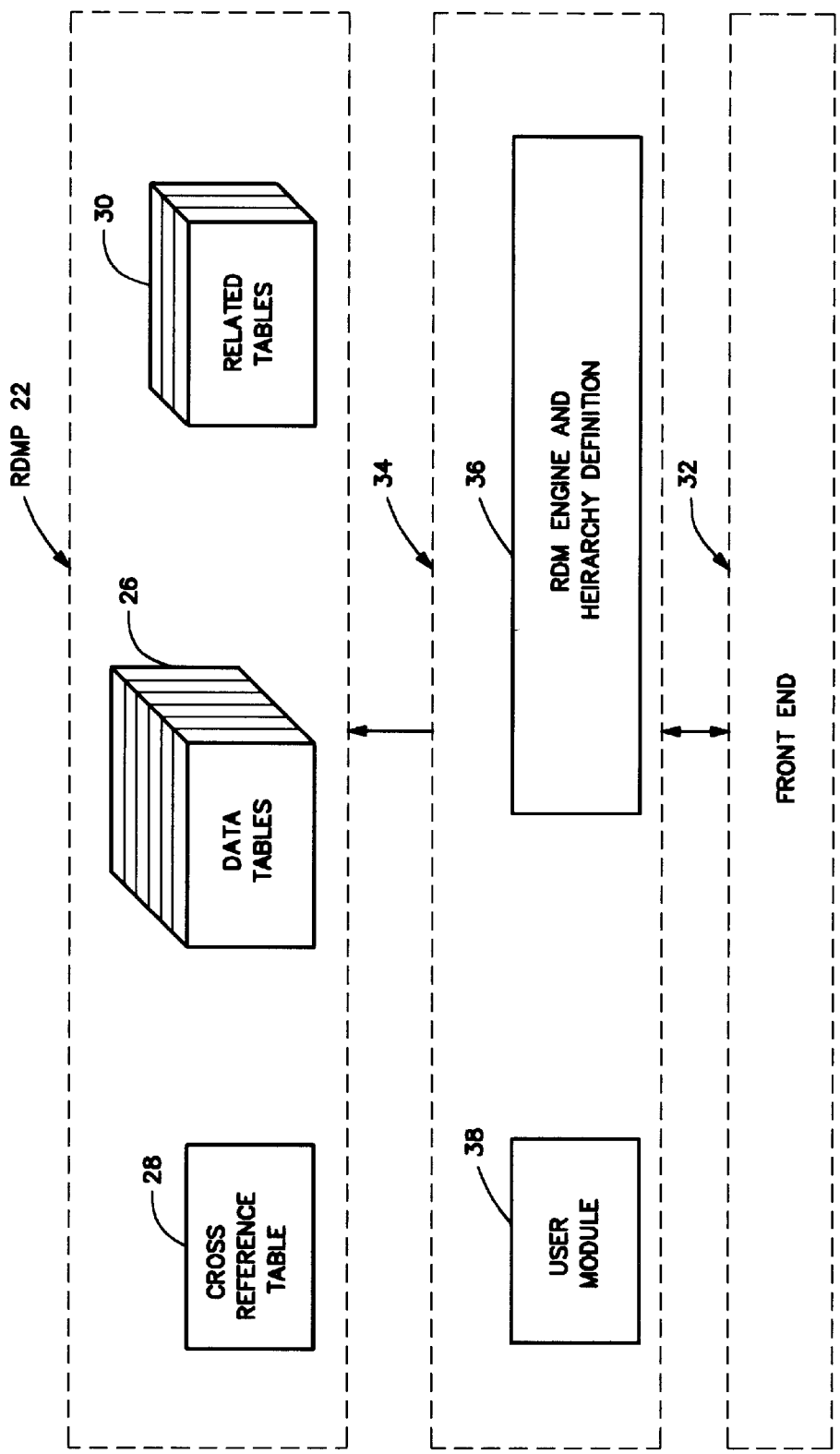
FIG. 2 is a schematic representation of the storage media portion of the engineering database system, containing a relational database management program for implementing the present invention.

The structure of a relational database management program 22, is shown schematically in FIG. 2. It should be understood that a wide variety of relational database management programs are available commercially for direct purchase; the inventor has implemented the present invention using the Oracle DBMP running in an IBM PC compatible platform under the control of the Microsoft Windows operating system. ORACLE is available from The Oracle Corporation, Belmont, Calif. However, the present description will enable anyone working in the field of database management, to implement and adapt the present invention in other DBM programs, operating systems, and platforms.

The program 22 can be understood as having three significant modules, indicated at 24, 32, and 34, respectively, in FIG. 2. The tables module 24 stores a plurality of records or data tables indicated at 26, and conventional relationship tables 30. Conventionally, each records table 26 contains a record name or number, and at least one data item associated with a particular record. Each record table can have hundreds, if not thousands, of records, and each record can have anywhere from one to dozens of data items. One or more additional tables such as 30, contain the equivalent of indices or pointers, which permit the establishment of a relationship between records that are in different data tables 26. In this conventional manner, a variety of record-to-record relationships can be established. Typically, this relationship is pre-established by the designer of the database, such as in a parent/child/grandchild relationship, or the like.

According to the present invention a different and/or additional kind of relationship is established, through a generic Cross Reference Table 28. Although the format of the Cross Reference Table 28 is somewhat similar to that of a data table 26, and the function is somewhat similar to that of the relationship table 30, the Cross Reference Table 28 achieves a novel function, by which the user can in run-time and on line, establish linking relationships between a data item of a record in one data table 26', with a record or data item in another data table 26".

The front end module 32 is conventional in providing for the recognition of input from the data input means 16 by the user for the creation and modification of records and relationships in tables 26 and 28, and to permit the user to make inquiries as to the content and relationships among records and as more fully explained below, among data items. The database designer and manager can set up or modify the database including tables 30 according to the design objectives.

The database engine module 34 contains the program logic 36 for defining and executing the creation of the tables and logic 38 for interpreting the actions or inquiries specified by the user through the data input means.

The remainder of this description will focus on the salient characteristics of the data tables 26, the generic cross reference table 28, and those features which can be characterized as user interface conveniences associated with functional block 38.

Figure 3:
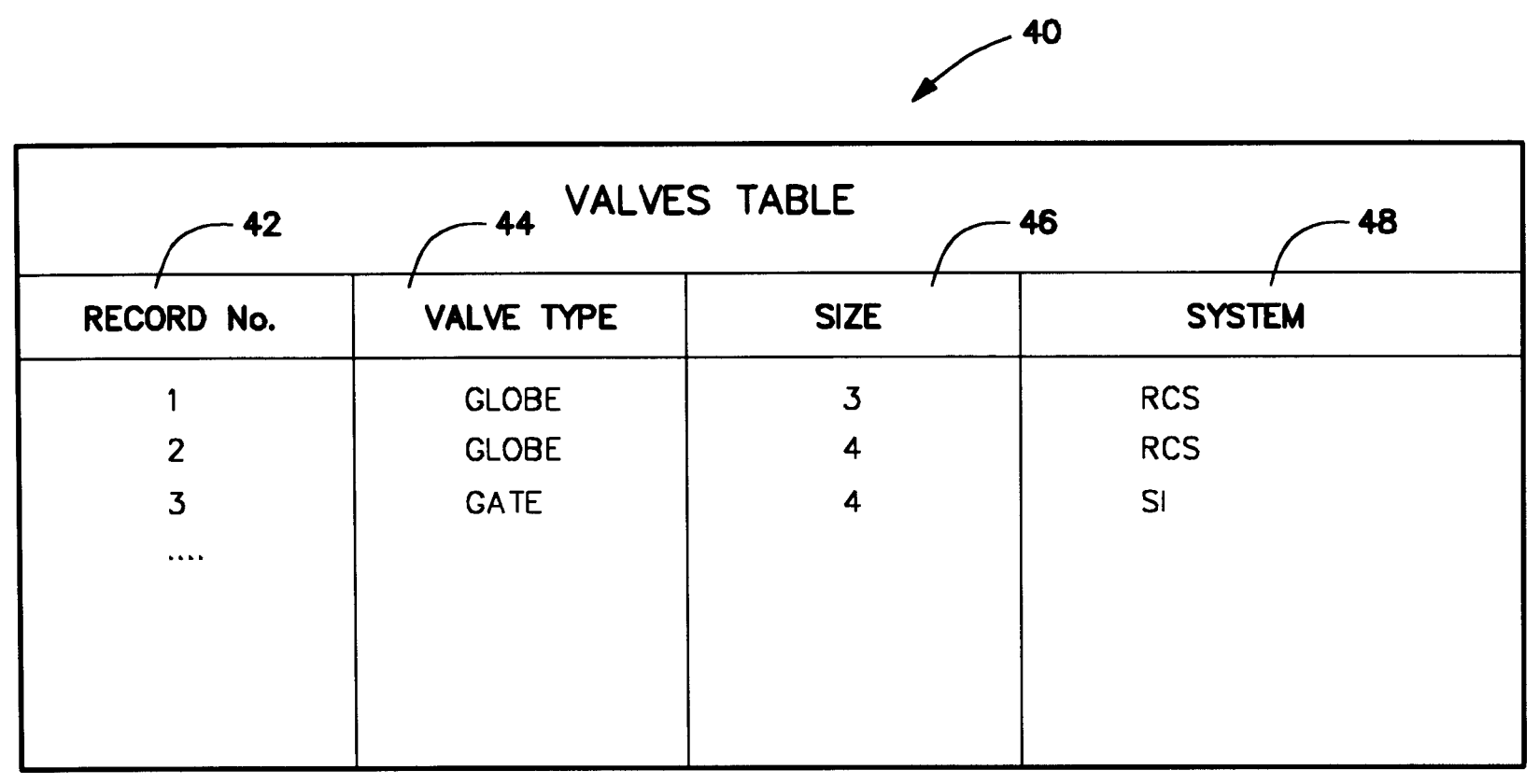

FIGS. 3, 4, and 5 schematically illustrate the three records tables 40, 50, and 56 (i.e., corresponding to individual tables such as 26', 26" in FIG. 2). The Valves Table 40 can be considered as having four columns, consisting of the record number column 42, the valve type column 44, the valve sizing column 46, and the plant system column 48. Each row corresponds to a unique record in the table. Each record has a unique number as shown in column 42, and such record contains three data items having the values shown in columns 44 through 48. For example, record number 2 specifies a globe valve with a four inch each size, which is a part of the reactor cooling system of the plant.

Similarly, the table 50 has the name "Requirements Table", with a column 52 which lists the record numbers for that table, and a column 54 which contains a data item in the form of a requirements statement for each record. Table 56 is named "Document Table" and contains column 58 in which the record numbers are numerically identified for this table. Each record has a document number in column 60 and a document name in column 62.

FIG. 6 schematically shows the content of the generic Cross Reference Table 28, which embodies a key aspect of the present invention. As illustrated, the first row of table 28 contains the first record of a user-defined relationship between a data item in Table1 (the Requirements Table 50) and a data item in Table2 (the Document Table 56). The user creates a forward cross reference for record number one in column 66, by identifying the first table name (Requirements 50) in column 68, the particular record of the data item in the first table, such as record number 15 as appears in column 70, and the particular data item 72 from that record. This triplet 68, 70, 72, (i.e., Table1, Record 1, Column 1) defines one end of the link. The user defines the second end of the link by entering a second triplet of, the Table2 name (Document) in column 74, the Record 2 number (3473) in column 76, and the particular data item (Doc Number) to be linked from the second record, in Column 2 at 78.

Preferably, another entry, in column 80, is associated with each record of column 66 in the cross reference table 28, to indicate the type of link, as selected from a pre-established set of possibilities. The permissible reference types may depend on the nature of the end points of the particular link. For Record No. 1 in FIG. 6, column 80 the reference type is "is stated in". The linking relationship can be understood as, "The Statement" in record number 15 of the Requirements table (50) is stated in the Document number for record number 3473 of the Document table (56).

The system automatically creates a matching cross reference by inverting the ends of the link entered by the user, as shown in FIG. 7. The system enters a partner record number (Record No. 1) in column 82, and a new record (Record No. 2 in column 66) and as a partner of the record entered by the user. Therefore, the partner Record No. 2 of the first link Record No. 1 defined by the user, has its own row in the cross reference table 28. Consequently, the link of a first dated item looking forward to a second data item, is reversed to appear as a forward link between the second data item and the first data item. The value in the reference type column 80 for the partner Record No. 2 in FIG. 7, is "states", thereby establishing the relationship conversely, that "the Document number in record 3473 of the Document table states for the Statement in record number 15 of the Requirements table". FIG. 8 shows the Cross-Reference Table 28 of FIG. 7, with the addition of other linking relationships among the data items in record tables 40, 50 and 56. In column 80, it can be seen that the link for Record No. 3 is a reference type "is mandated by", with the partner Record No. 4, having the reference type "mandates". The table 50 only has one data item 54 associated with each record number 52. Therefore, a link which specifies the data item of a particular record in table 50, is tantamount to establishing a relationship at the record level. Such a relationship at the record level could also be established for records in tables, such as 40, which have more than one data item per record. Thus, according to the invention, the generic Cross Reference Table 28 can specify links which at one end have a record or data item, and at the other end have a record or data item, thereby defining any of a record-to-record, item-to-item, or item-to-record relationship.

Appendix I contains a table definition for a sample implementation of the generic cross reference table, in the preferred embodiment including entries for comments and other creation-related information. Appendix II is a table definition containing paired records for reference types specific to the Table1/Table2 combinations of Appendix I. Appendix III is a coding procedure for identifying all new cross reference records and inserting a partner record, as well as updating the new record with the partner records's number. Responsibility for creating the initial cross-reference record lies within the application which does the cross referencing. The partner column in the new record is left blank. Depending upon the cross-referencing application, one or more initial cross-reference records may be created. Upon committing the transaction entering the initial cross reference record to the database, an automatic action is initiated creating the partner record.

Appendix IV is a set of business rules which define conditions and constraints associated with implementation of the invention in the preferred embodiment. Appendix V is a list of selected definitions of the terms used in the other appendices.

Since the number of cross references in the given cross reference table 28 can grow very large, it may be advantageous to reduce the data volume of the table by using numeric identifiers rather than character table and column names. Any space saving would be offset by additional processing and maintenance overhead associated with fetching correct identifiers and maintaining the list of table and column name identifiers. The prototyped approach used "varchar2" character types for table and column names to minimize white space storage. Comments could also be off-loaded to a satellite table, although it is felt that comments are infrequently added and don't contribute much to the overall size of the table.

The use of table names and column names requires that the object's real names be used in all circumstances. This means that views and synonyms must be resolved into the correct table and column names to prevent incomplete query results. Various mechanisms are used to assure correct names are used. The first is an application subroutine which launches an ORACLE stored procedure to find the correct tablename when the supplied tablename from the application is a synonym. The resolver subroutine is capable of walking a chain of synonyms until the relevant table name is identified.

Use of the table name can be extended to enable linking to tables in other schemas within the same ORACLE database by prepending the schema name followed by a dot to the table name. This prevents identical tablenames in different schemas from introducing reduced specificity. This may be extrapolated to a distributed database environment by prepending location data to tables which exist in different locations.

FIGS. 9–15 are copies of screen displays taken from implementation of the preferred embodiment, whereby the interactive linking of a link pair is accomplished by means of drag and drop user interface procedures, i.e., by using a mouse for cursor control on a Microsoft Windows operating system display.

Figure 9:
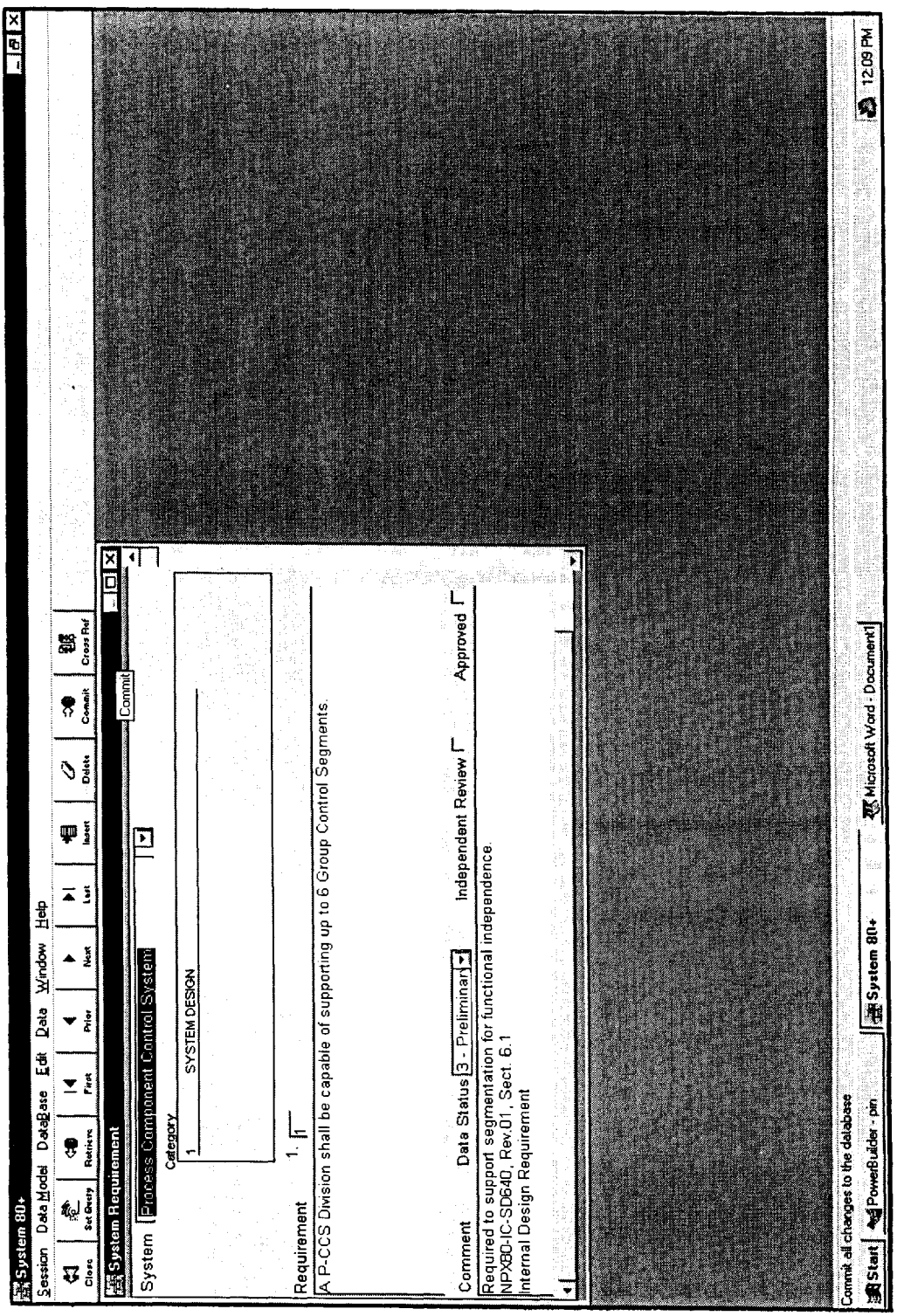
FIG. 9 is a copy of a user screen display showing one embodiment by which a new system requirement is added to the database.
Figure 10:
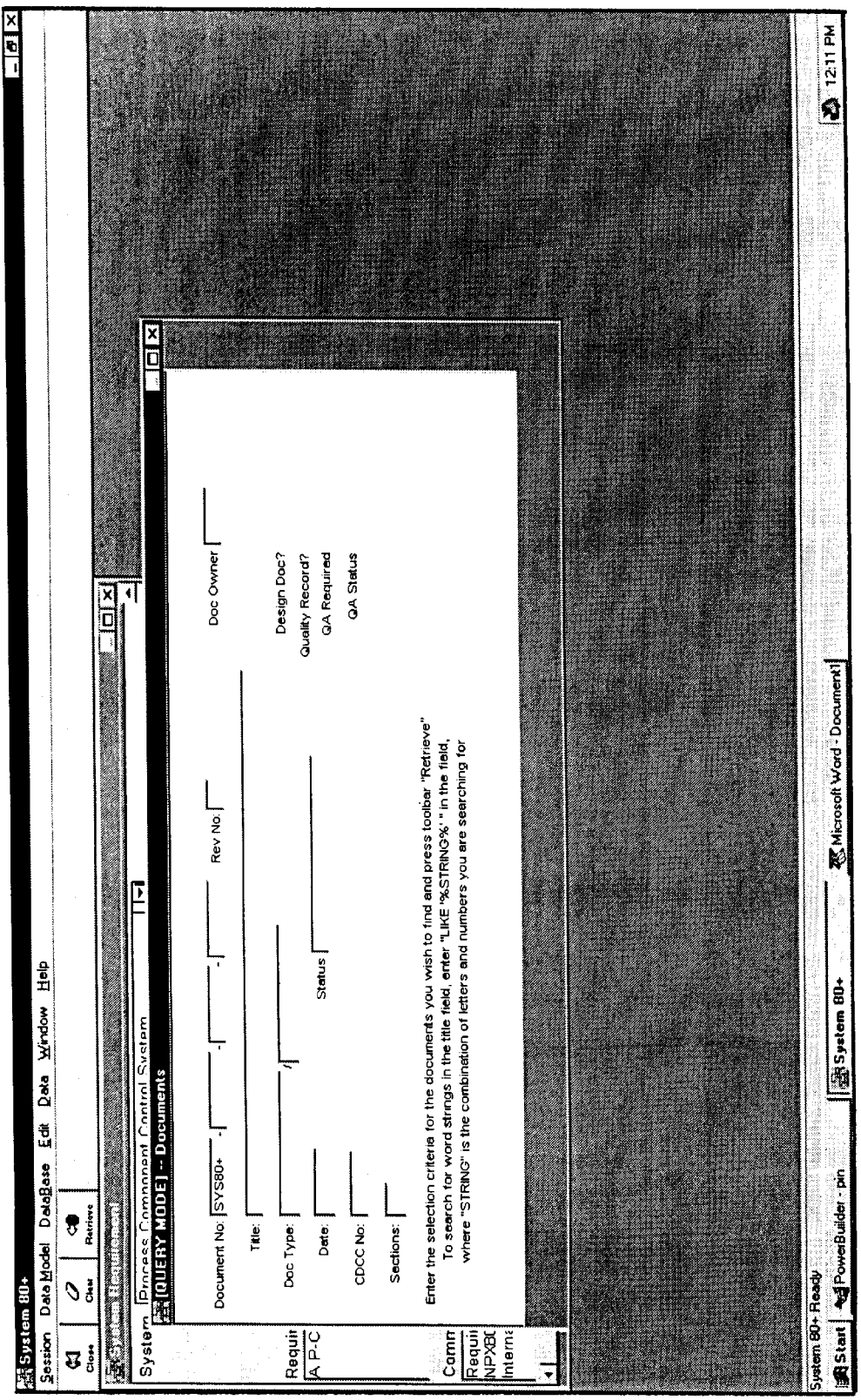
FIG. 10 is a copy of a user screen display showing how the user can query the database to find the existing source document which states the system requirement added in FIG. 9.
Figure 11:
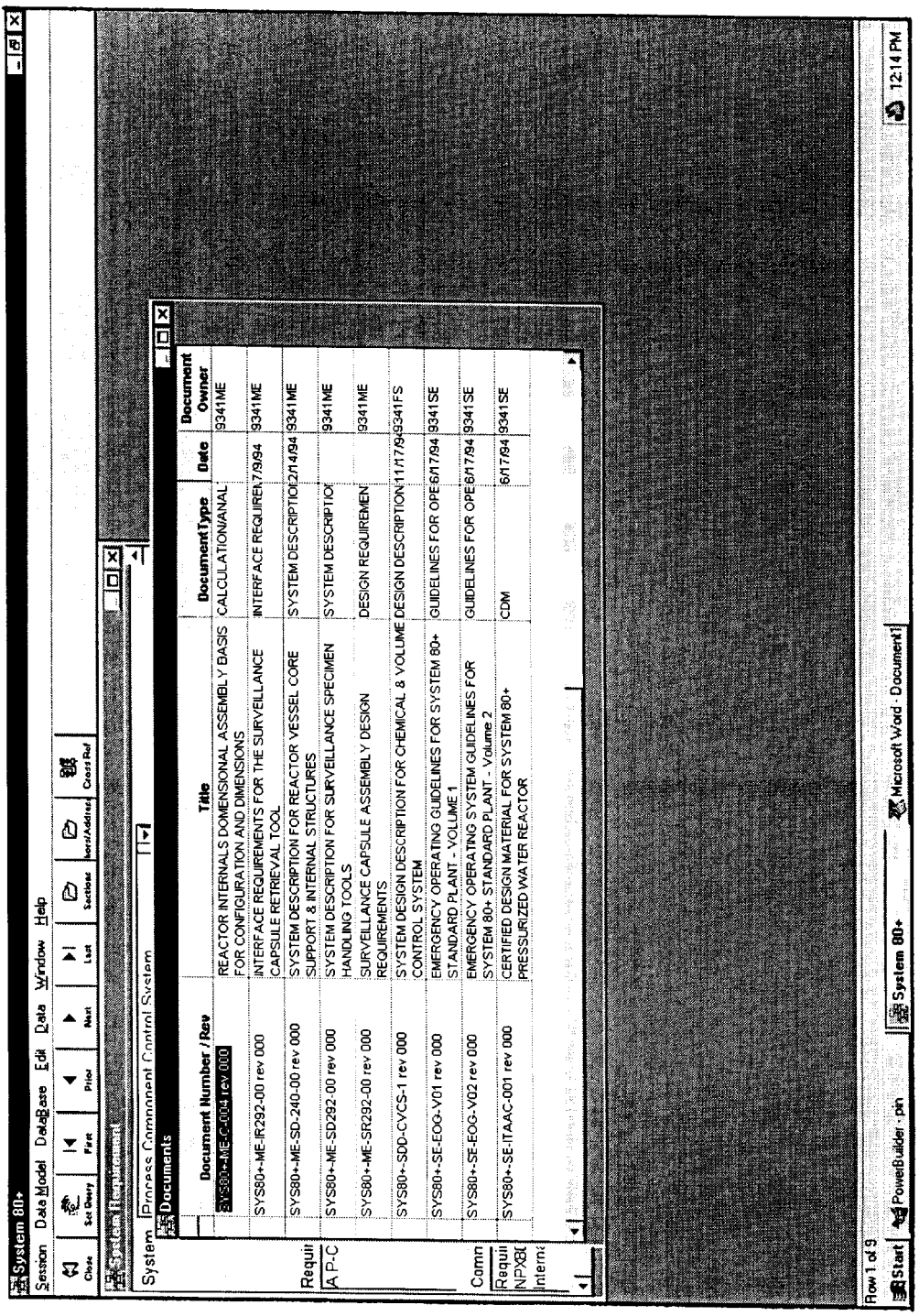
FIG. 11 is a copy of a user screen display showing a list of all the documents which match the query defined as shown in FIG. 10.

As a starting point, FIG. 9 shows how a new system requirement can be added to the Requirements Table 50 shown in FIG. 4, through a screen provided for that purpose. The user adds the requirement based on finding it stated in an existing document. As shown in FIG. 10, the existing document which states the system requirement is found in the Documents Table 56 shown in FIG. 5. The document may be found as a result of a query by the user using the document browser query screen. As shown in FIG. 11, a list of all the documents which match the query is presented to the user.

Figure 12:
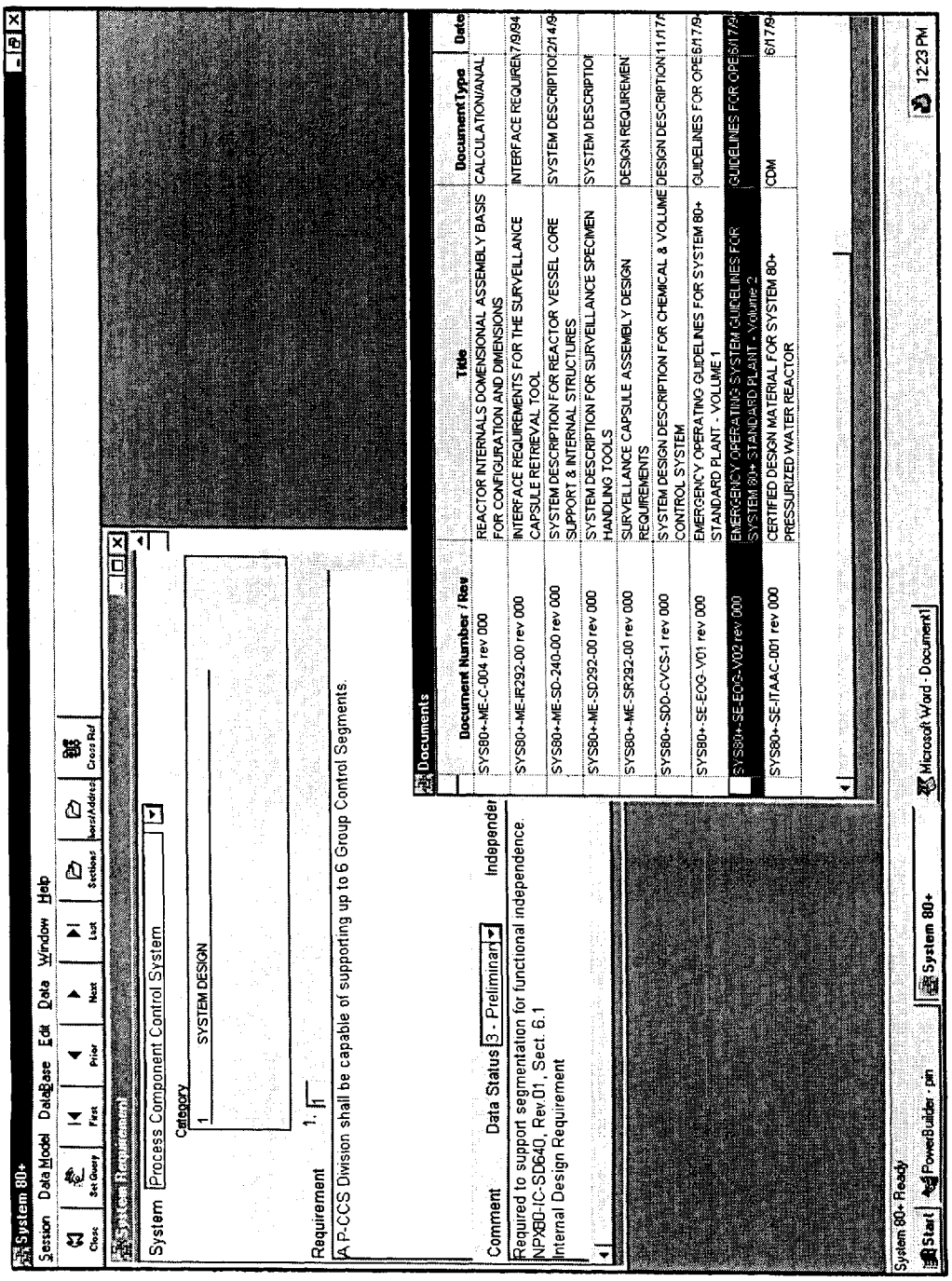
FIG. 12 is a copy of a user screen display showing "tiled" sub screens whereby the user can see a system requirement and the list containing the associated document record, simultaneously.

As shown in FIG. 12, the user may "tile" the two screens shown in FIGS. 9 and 11, so that the new record from the Requirements Table 50 and a list of records from the Documents Table 56 containing the source document can be viewed simultaneously. The user makes the link by "selecting" the particular requirement record or data item using the mouse-controlled cursor, and "dragging" the cursor to the related document record or data item to be cross-referenced. When the cursor is on the appropriate document record, the user "drops" the requirement onto the document by releasing the mouse button. Because of the bi-directionality of the method, the start and end points of the drag-end-drop operation can be reversed without changing the result. The method is thus impervious to whether the user "drops" the requirement onto the document or "drops" the document onto the requirement.

Figure 13:
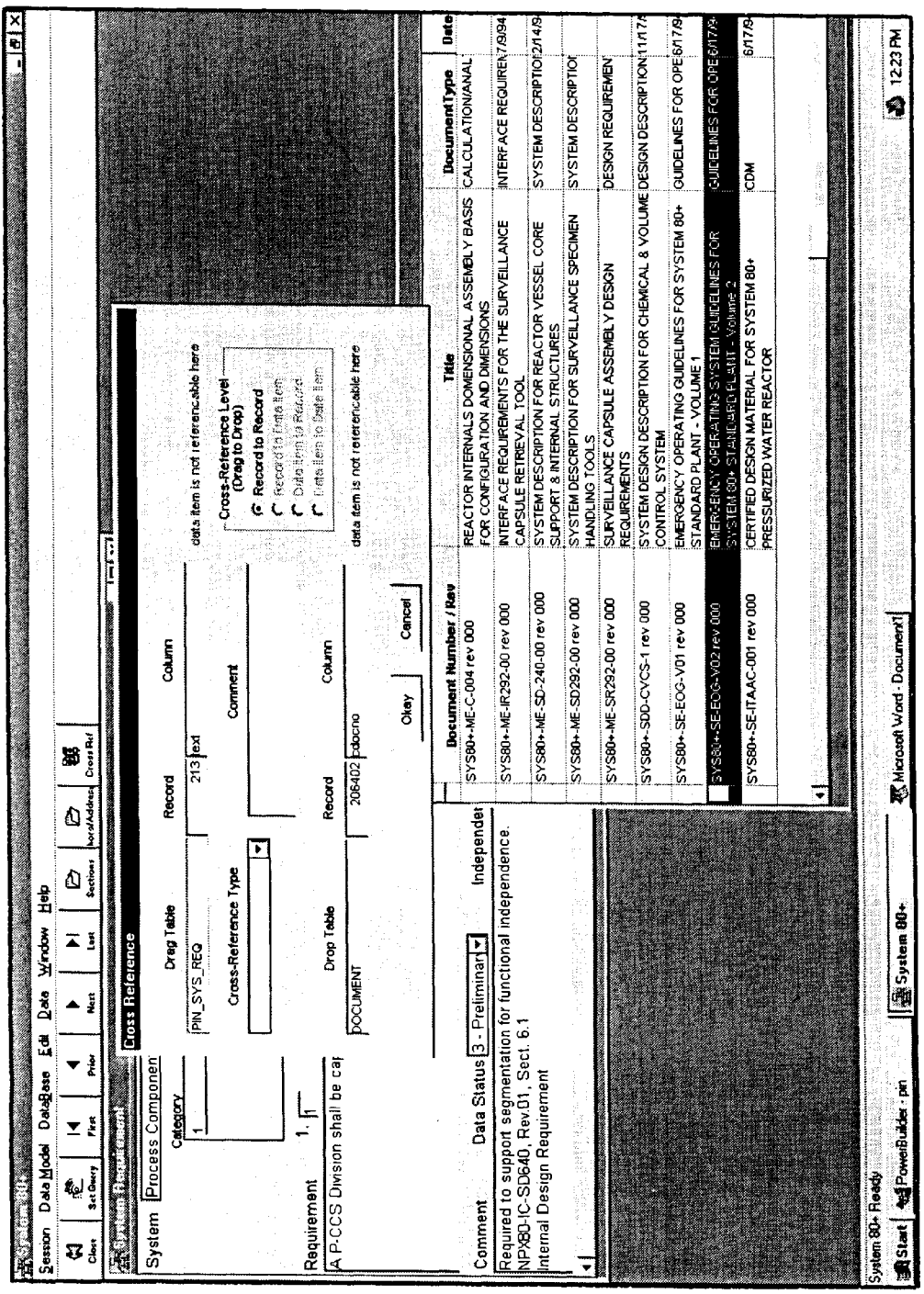
FIG. 13 is a copy of a user screen display whereby the system opens a cross reference pop-up display in response to the user dragging the requirement onto the associated document and dropping it and shows the drag and drop points involved in the creation of a record-to-record link.
Figure 14:
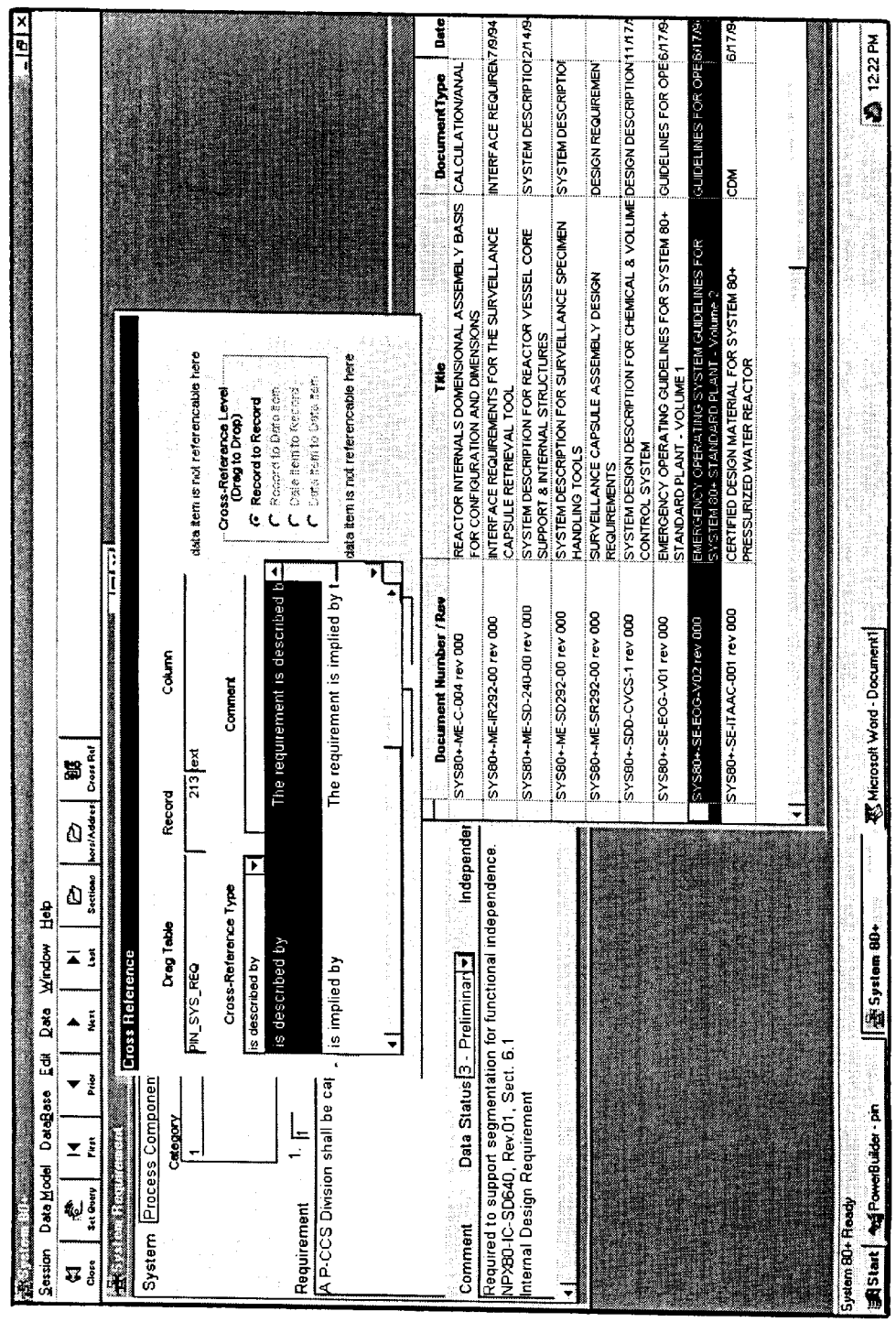
FIG. 14 is a copy of a user screen display whereby the user can select a cross reference level and select a reference type from a drop down list appropriate for the tables involved in the selection.

As shown in FIG. 13, the system opens a cross reference pop-up display which shows the drag and drop points, including column information if a data item is at one or both of the link ends. As shown in FIG. 14, the system allows the user to select a cross-reference level (record-to-record is the default) and select a reference type from a drop down list appropriate for the tables involved in the selection. The user may also add any comments to further describe the nature of the cross reference. When the user is satisfied, he clicks the "OK" button and the system creates a pair of cross reference records in table 28.

Figure 15:
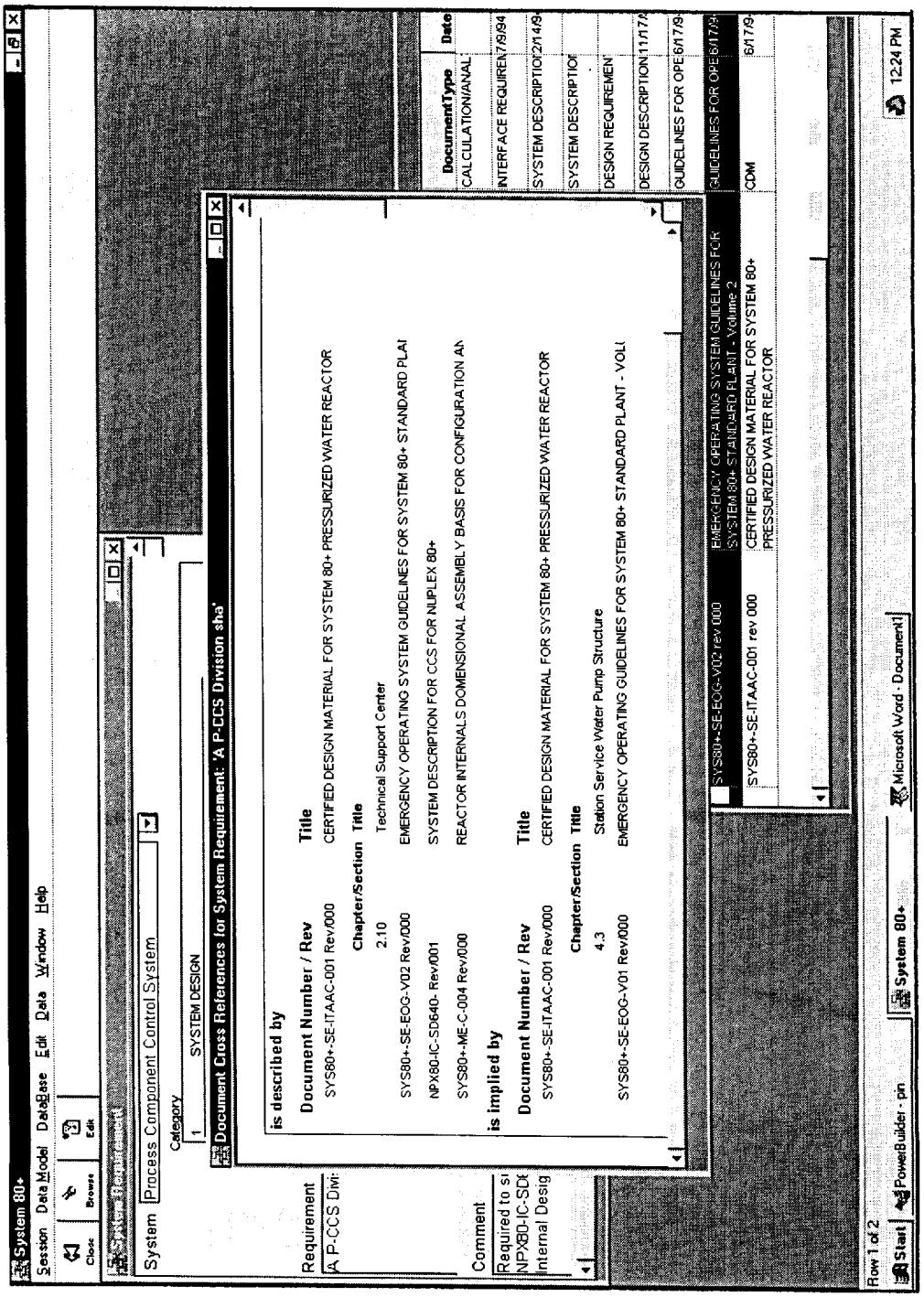
FIG. 15 is a copy of a user screen display which shows all of the document cross references associated with the current requirement record, initiated in response to the user pressing a toolbar button associated with the requirement display.

FIG. 15 shows a pop-up display confirming the creation of a new cross-reference record pair. From the Requirements screen, the user may press a tool bar button to view all of the cross-references for the current requirement record. A pop up display screen shows the link along with the reference type for the record.

Batch creation of link records may also be supported with pre-defined link types and loaded into the database. At load time, appropriate partner records are automatically generated to complete the link, and specific information of the load operation may be used to specify time and date of the links and the creator of the batch links. Alternatively, the load file may be created to include this information on an individual link basis.

The invention described above provides for traceability as a fundamental functional attribute, rather than being a separate module or application within an engineering database environment. The invention provides for document traceability, which can be defined as the ability of the database system to identify the source of information referenced in the design process and included in design documents. It also includes the ability to identify documents which have used information from a particular document or portion of a document. To handle very complex documents, reference links can be based on data items corresponding to sections of complex documents.

Creation of the reference links does not require the user to leave the screen or the environment in which the user is currently working, because the reference screens are pop-up non-model or model windows. Similarly screens requiring supplementary information are available from the pop-up screens. These may include query screens to find documents or document sections in the index and data entry screens to enable the user to add document or section information to the appropriate indices.

Design basis traceability is also enhanced. This level of traceability is intended to provide documentation of the design basis data which was used for design efforts. Such traceability extends beyond linking information to source documents or documents section. It includes the ability to link design information to design requirements, design data, design parameters and assumptions. The invention achieves this traceability, by enabling the design engineer user to easily create reference links from any of the products of his engineering effort to a wide variety of input information created by upstream engineering processes. The linking is at the discretion of the designer, based on his judgment as to whether reference links are warranted.

APPENDIX I

Link Point Tables - All tables to which link records may point must contain the following column:
record_no   number(10)   unique   not null
PIN_GEN_XREFS - This table contains all cross reference links for the entire database.
Each link comprises two records - a forward record with a specified reference type and one link point assigned to table/record/column1, and the other link point assigned to table/record/column2, and a reverse record with the partner reference type and reversed link points.

| record_no | number (10) | unique | not null | unique record identifier |
|---|---|---|---|---|
| partner | number(10) | | not null | record identifier of partner record |
| table1 | varchar2(30) | | not null | required table name of link point |
| record1 | number(10) | | not null | required record number of link point |
| column1 | varchar2(30) | | | optional column name of link point |
| table2 | varchar2(30) | | not null | required table name of link point |
| record2 | number(10) | | not null | required record number of link point |
| column2 | varchar2(30) | | | optional column name of link point |
| ref_type | varchar2(30) | | not null | link type - allowed values are based on the reference types for the Table1/Table2 combination as in PIN_GEN_XREF_TYPES |
| ref_desc | varchar2(500) | | | comment about cross reference link |
| origin | varchar2(30) | | not null | username of creator of link |
| org_date | date | | | timestamp for creation of link |
| level_code | varchar2(1) | | | level code which identifies cross reference records which are associated with CDM information and which must not be deleted |

APPENDIX II

PIN_GEN_XREF_TYPES - This table contains paired records for reference types specific to the Table1/Table2 combinations

| record_no | number(10) | unique | not null | unique record identifier |
|---|---|---|---|---|
| partner | number(10) | | not null | record identifier of partner record |
| table1 | varchar2(30) | | not null | required table name of one link point |
| table2 | varchar2(30) | | not null | required table name of other link point |
| ref_type | varchar2(30) | | not null | name of link type |
| ref_type_desc | varchar2 (2000) | | | detailed description of reference type |

APPENDIX III

PGX AFT,SOL

```
CREATE OR REPLACE TRIGGER PIN
_GEN_XREFS_POST
AFTER INSERT ON PIN_GEN_XREFS
This procedure identifies all new cross reference records in
PIN_GEN_XREFS by looking at the
value of the partner column. Where there is no data, the record
is defined to be a new record. It creates a cursor for each new
record found and loops through the new records, inserting a
partner record and updating the new record with the partner
record's number
DECLARE
    CURSOR xref IS
        SELECT RECORD_NO, TABLE1, RECORD1,
        COLUMN1, TABLE2,
        RECORD2, COLUMN2, REF_TYPE,
        REF_DESC, STATUS, ORIGIN,
        ORG_DATE, LEVEL_CODE
        FROM PIN_GEN_XREFS
        WHERE PARTNER=0
        FOR UPDATE OF PARTNER;
    new_record_no   number(10);
    new_ref_type    varchar2(30);
BEGIN
    FOR OLD IN xref LOOP
        abb_audit.gel_item('new_recno',new_record_no)
    BEGIN
        SELECT ref_type INTO new_ref_type
            FROM pin_gen_xref_types
            WHERE record_no = (SELECT MAX(PARTNER)
                            FROM pin_gen_xref_types
                            WHERE ref_type=old.ref-type
                            AND table2=old.table2
                            AND table1=old.table1);
    EXCEPTION
        WHEN NO_DATA_FOUND THEN
            new_ref_type:='is '"||TRANSLATE
            (old.ref_type,'','_')||'"d by';
        WHEN TOO MANY ROWS THEN
            new_ref_type:='is '"||TRANSLATE
            (old.ref_type,'','_')||'"d by';
    END;
    UPDATE pin_gen_xrefs - updates partner column of initial cross reference record
        SET partner=new_record_no
        WHERE CURRENT OF xref;
    INSERT INTO pin_gen_xrefs - inserts inverse cross reference record
        (record_no, partner, table1, record1, column1, table2, record2, column2, ref_type,
        ref_desc, status, original, org_date, level_code)
        VALUES (new_record_no, old.record_no, old.table2, old.record2, old.column2,
                    old.table1, old.record1, old.column1,
                    new_ref_type, old.ref_desc, old.status, old.origin,
                    old.org_date, old.level_code);
    END LOOP;
EXCEPTION
    WHEN OTHERS THEN
        abb_audit.mark_error
        ('pin_gen_xrefs_post exception=others');
        RAISE;
END pin_gen_xrefs_post;
```

APPENDIX IV

Business Rules

Each cross reference link is represented by two partnered records in the PIN_GEN_XREF table created within the same database transaction.

Each cross reference link at the least represents a record-to-record link. Record-to-Data-Item and Data-Item-to-Data-Item links are also possible.

Link records are categorized by reference type. Allowable reference types for a specific link are based on the tables associated with the link points and are those for the link point tables listed in the table PIN_$GENXRF$_TYP.

Cross reference link records can only be deleted by the originator.

Cross reference link records must not be deleted except when:
  one of the link pair records is deleted or if a data item link, the data item value is changed or
  the system administrator and owner of the link concur that the link is inappropriate Deleting either partner record requires that its corresponding partner record also be deleted.

Comments may be optionally associated with a cross reference link and may be changed by the originator.

Cross reference records with a level_code=0 are CDM-related and must not be deleted or modified Cross Reference Type records (PIN_GENXRF_TYP) may only be deleted if no PIN_GEN_XREF records have the associated type for the given table pair.

Cross Reference Type records (PIN_GENXRF_TYP) may not be changed except to clarify or more accurately describe the meaning of a reference type.

APPENDIX V

Definitions:

| | |
|---|---|
| Data Item | The specific item of data stored in a specific table, column, and record |
| Data Item Value | The value of a specific data item. The data type of the data item may be numeric, character, date, boolean, or long. |
| Database Transaction | The unit of database update work which the underlying RDBMS guarantees will be completed in its entirety or not at all. |
| Link Level | The level of a link's detail. Link level can be record-to-record, data-item-to-record, or data-item-to-data-item |
| Link Point | One of the record/data item pairs whose relationships is recorded in a link record |
| Link Record | A record which stores information about a relationship between two records/data items |
| Link Type | One of the allowed values for categorizing the relationship between two link records/data items |
| Partner Link Record | The link record which corresponds to the inverse of a particular link record |
| Partner Link Type | The link type which corresponds to the inverse of a particular link type |
| Record Number | A unique numeric identifier for each record in a given table. Each table used in a link point is required to have a record number column named "record_no" of data type "number(10)". |

I claim:

1. A database management system having data storage means, data input means, and display means, said data storage means containing a plurality of tables into which data items are entered and stored, the improvement wherein said tables comprise:
    at least three records tables each having an identifying name and at least two records, each record having an identifying number, each number having at least two columns of data items, whereby a particular item of data is identified by a unique triplet of table name, record number, and column;
    a cross reference table which contains a cross reference link for at least one data item in each of said three records tables, each link being defined in the cross reference table by a row containing at least the columns of,
        (a) a unique cross reference record number in the cross reference table, for a particular link from a first data item in a first of said three records tables, to a second data item or record in a second of said three records tables,
        (b) a unique cross reference partner record number for said particular link, from the record or data item of said second records table to said data item of said first records table,
        (c) the table name of said first record table,
        (d) the record number of said first data item from said first record table,
        (e) the column of said first data item from said first record table,
        (f) the table name of said second record for said second data item,
        (g) the record number of said second data item or record in said second table, and
        (h) the column of said second data item or record from said second record table.

2. The system of claim 1, wherein said cross reference table includes a column for a particular value from a set of permitted values indicating the type of relationship between the first data item from the first record table and the second record or data item from second record table.

3. The system of claim 1, wherein said cross reference table includes a column for comments about the cross reference link between the first data item from said first table and the second data item or record of said second record table.

4. The system of claim 1, wherein said cross reference table includes a column for the name of the user who created said particular cross reference link.

5. A system for linking and displaying information records in an engineering database for a nuclear power plant, comprising:
    a computer platform including
        data processor means for performing arithmetic and logic operations on digitized data,
        data storage means coupled to the data processor means, for storing digitized data including programmed instruction data and user-supplied operand data,
        data input means for supplying operand data to the data processor means,
        output means for recording at least some of the results of the arithmetic and logic operations of the data processor needs, and
        monitor means, for displaying information in response to the operation of the data processor means;
    said storage means containing a stored relational database computer program including,
        a tables module for storing a plurality of records tables and relationship tables into which operand data items concerning the power plant are entered and stored;
        a front end module for the user to create and modify records, inquire as to relationships among records, and request that the output means record information about said records;
        a database engine module containing logic for defining the addressing structure and executing the creation of the tables and controlling the actions specified by the user through the data input means; wherein said tables module includes
            at least three records tables each having at least two records, each record having a number, each number having at least two columns of data items, whereby a particular item of data is identified by a unique triplet of table name, record number, and column;
            a cross reference table which contains a cross reference link for at least one data item in each of said three records tables, each link being defined in the cross reference table by a row containing at least the columns of,
                (a) a unique record identifier in the cross reference table, for a particular link from a first data item in a first of said three records tables, to a second data item or record in a second of said three records tables,
                (b) a unique cross reference partner record identifier for said particular link, from the record or data item of said second records table to said data item of said first records table,
                (c) the table name of said first record table,
                (d) the record number of said first data item from said first record table, (e) the column of said first data item from said first record table, (f) the table name of said second record for said second data item, (g) the record number of said second data item or record in said second table, and (h) the column of said second data item or record from said second record table.

6. In a system for linking and displaying information records in an engineering database, wherein said system has data processor means, data storage means coupled to the data processor means, said storage means including a stored relational database computer program including a plurality of tables each containing a plurality of records, monitor means, for displaying information in response to the operation of the data processor means, data input means for supplying data to the data processor means, wherein said data input means includes a cursor control device whereby data stored in said storage means and displayed on said monitor, can be copied from one record stored in said data storage means to another record stored in said data storage means, wherein said tables include, at least three data record tables each having at least two records, and each of said two records having at least two data items, and a cross reference table which contains one record defining a link between a first of said data records and a second of said data records, the method of creating said link, comprising:

viewing at least a portion of said first record on a first portion of said monitor means, simultaneously viewing at least a portion of said second record, on a second portion of said monitor means, with said cursor control device, dragging said first record across said monitor and placing said first record on said second record displayed on said monitor, and activating a command which completes a transaction in the database, whereby said first record is linked to said second record in said cross reference table.

7. The method of claim 6, including the steps of, placing the cursor on a data item in said first record, dragging the data item to said second record, and selecting whether the link is to be created between the first and second records, or between said data item of the first record and the record or a data item in said second record.

\* \* \* \* \*